UNITED STATES PATENT OFFICE.

REIMAN G. ERWIN, OF ST. ALBANS, WEST VIRGINIA, ASSIGNOR TO INTERNATIONAL BITUCONCRETE COMPANY, A CORPORATION OF DELAWARE.

PLASTIC COMPOSITION AND PROCESS FOR MAKING THE SAME.

1,370,637. Specification of Letters Patent. Patented Mar. 8, 1921.

No Drawing. Application filed July 6, 1920. Serial No. 394,189.

*To all whom it may concern:*

Be it known that I, REIMAN G. ERWIN, a citizen of the United States, residing at St. Albans, in the county of Kanawha and State of West Virginia, have invented certain new and useful Improvements in Plastic Compositions and Processes for Making the Same, of which the following is a specification.

My invention relates to roofing, flooring and allied structures in which bituminous compounds act as the preservative binders of vegetable or mineral particles; and my objects are to provide (*a*) a plastic composition of more lasting ductility in cold exposures, (*b*) higher melting and flow points of the bituminous content in relation to temperature degrees, (*c*) increased density and inherent stability and (*d*) greater economy over the prior art.

In carrying out my invention as disclosed in co-pending joint application Serial No. 389,482 filed June 16, 1920, I have discovered that when there is present only such colloidal dust as therein described (as distinguished from adventitious dust mixed with larger fines of 200 mesh sieve size and larger, such as are invariably specified in bituminous structures known to the prior art) and when such chemically treated bitumen as therein described is present in such a mastic in quantity in excess of that required to impregnate the dust, coat it and bind it together, such excess of bitumen in that mastic, in its relation to the present invention, will not only be absorbed by added mineral and vegetable aggregate of relatively larger sizes, but, in entering it, will carry with it some of the dust in such colloidal suspension of the bitumen, with the advantageous result that the mastic acts as a more stable filler of greater inherent strength and density than pure bituminous compounds heretofore used, or mastics composed of non-colloidal dust of insufficient impalpability and untreated bitumen, so heretofore used, and indeed, such mastic as herein used, so acts as a filler of greater inherent stability density and strength than even trap rock aggregate particles of larger sizes, herein specified, the interstices between which my mastic fills after the excess bitumen thereof has been adsorbed and used as the impregnating preservative, and binder coating of the added aggregate.

Accordingly, when all pores within and interstices between the larger aggregate of such structures are to be filled as herein specified, the heretofore essential specific grading as to the sizes of such additional aggregate, and the mechanical clasp thereof in their relation to each other, may be dispensed with without affecting, except to increase, the density, compressive strength or inherent stability of the structure of which such filler forms a part.

In carrying out the present invention in its relation to roofing, in example, I have discovered that when pulverized lime is added to a mixture of colloidal dust, sulfur, sodium chlorid and sodium sulfate and injected into the bitumen in the manner described in my said co-pending joint application, a tougher, stiffer and relatively harder product is produced, which is more adaptable to roofing purposes than my more ductile products of the present process, in which I eliminate the lime, in cases, for example, such as where the material is to be used for flooring; and I have further discovered that when the product is formed by compression into the desired shape through a die, reinforcing wire or other such agent embedded therein and surrounded by the plastic mass when hot during the process of forming the product, will still further strengthen the product and render more permanent its desired shape regardless of stresses to which it may be subjected.

In practice I inject, into air suspension, to preheated bitumen in a vat subjected to sustained heat and suction, a mixture of the above stated chemicals, in proportions hereinafter specified, with dehydrated clay or other dust of 2. to approximately 2.8 specific gravity (or the equivalent volume of Kieselguhr of 30 to 40 specific gravity) composed entirely of particles which will pass a 200 mesh sieve more than 60% being smaller than .02 millimeters in gradations down to smaller than two microns, and after complete dehydration of the mass therein, subject the same to continued heat to combine the ingredients together.

For the purposes of the present invention I prefer to add to such dust the following percentages thereof viz.: of sulfur 6 to 10; lime 5 to 8; sodium chlorid 1 to 5, sodium sulfate 1 to 5, in pulverized form, the dust and chemicals mixture so injected into the bitumen being in proportion by volume forty to sixty per cent. respectively.

While the mastic above described is at a temperature of approximately 300 to 350 deg. Fahr., I mix the same with preheated mineral aggregate of relatively larger run-of-the-crusher sizes, in proportions, 40 to 60% by volume of the mineral aggregate and mastic, respectively; and in a modification of my invention I have substituted for the larger mineral aggregate comminuted asbestos, rags, hemp, wood pulp, wood particles and other vegetable fibrous matter from which the acids, moisture and dust have been removed, and have noted that a relatively larger proportion of colloidal dust so suspended in the bituminous compound aforesaid is practically agglomerated in a final product of such a mixture without an excess of bitumen, when the following proportions are present therein, viz.: of mastic 50 to 70%, fibrous material 30 to 50% according to its nature; and as a further modification of my invention I have mixed such mastic in said proportions, with approximately 50% of each of the above mineral and vegetable ingredients; and in each instance have then agitated the mass in a vat under the influence of sustained heat and suction a sufficient length of time to completely dehydrate the mass, and to fix its temperature uniformly to approximately 250 degrees Fahr., at which time the mass is removed from the vat and compacted through dies, or in sheet form by tamping, rolling, or molded into blocks, when at that temperature, to shape.

In my use of vegetable aggregate mixed with said mastic I have noted that the pores of that aggregate are abnormally enlarged by the heat aforesaid, during the operation, and that they consequently adsorb the mastic itself, including the stated proportion of colloidal dust therein contained at the time, as distinguished from pure bitumen adsorbed by such vegetable matter in the case of non-colloidal dust mastic, known to the prior art, with the result that, in the present invention, to the extent of such dust content (as distinguished from the more expensive bitumen content) is the cost of the product reduced, in combination with greater inherent stability, and higher melting point of the product of which such impregnated vegetable matter or mineral matter filled with such mastic, forms a part, all in furtherance of the object of my invention.

I claim:

1. The process of producing a plastic composition consisting in colloidally suspending a mixture of mineral dust all of which will pass a 200 mesh sieve, 60% being smaller than .02 millimeters, sodium chlorid and sodium sulfate in preheated bitumen, adding pulverized sulfur to the mass, and then agitating the mass in a vat subjected to suction and to sufficient heat to combine the ingredients and their derivatives, then mixing comminuted vegetable particles of various sizes with said composition in sufficient quantity of the latter to fill the pores within and the voids between and to coat and bind together, the aggregate when compacted to shape, then agitating the mass in a vat under the influence of sustained heat and suction; then removing the mass from the vat and compacting the same to shape, substantially as described.

2. The process of producing a plastic composition consisting in colloidally suspending a mixture of colloidal mineral dust, sodium chlorid and sodium sulfate and injecting sulfur into preheated bitumen in a vat subjected to heat and suction and combining said ingredients and their derivatives with each other therein, then mixing vegetable and mineral particles of relatively larger sizes, in the absence of dust, with said compound in sufficient quantity of the latter to merely impregnate completely, to coat and to bind together the mass when compacted to final shape; then agitating the mass in a vat under the influence of sufficient heat and suction to completely dehydrate the same and to fix its temperature at approximately 250 degrees Fahr., then removing the mass from the vat and compacting the same to shape, substantially as described.

3. The process of producing a plastic composition consisting in colloidally suspending a mixture of colloidal mineral dust, pulverized lime, sodium chlorid and sodium sulfate and injecting sulfur into preheated bitumen in a vat subjected to heat and suction during agitation of the mass therein, and combining said ingredients and their derivatives with each other; then mixing vegetable fiber in the absence of dust with said composition in sufficient quantity of the compound and fiber to merely cause the composition to completely impregnate, to coat and to bind the mass together when compacted to shape; then compacting the same in a mold to shape, substantially as described.

4. The process of producing a plastic composition consisting in colloidally suspending a mixture of colloidal mineral dust, pulverized lime, sodium chlorid and sodium sulfate and injecting sulfur into preheated bitumen in a vat subjected to suction, during agitation of the mass therein under the influence of sustained heat sufficient to combine the ingredients and their derivatives, then mixing vegetable and mineral matter in the absence of dust with said compound in sufficient quantity of the compound to impregnate, coat and bind the aggregate when compacted to final shape; then compacting the same through a die to shape, substantially as described.

5. A new composition of matter comprising mineral dust all of which will pass a 200 mesh sieve, 60% being smaller than .02 millimeters, colloidally suspended in bitumen vulcanized by and chemically combined with derivatives of sulfur, sodium chlorid and sodium sulfate and impregnating, coating and binding vegetable fibers, the ingredients being mixed in the following proportions of each by volume, viz: of the dust content, 6 to 10% sulfur, 1 to 5% sodium chlorid; 1 to 5% sodium sulfate mixed with from 80 to 92% of dust, which mixture in relation to the bitumen shall be from forty to sixty per cent. of each; of the vegetable ingredient 30 to 50% mixed with 50% to 70% of said filler, substantially as described.

6. A new composition of matter comprising mineral dust of colloidal nature suspended in bitumen combined with sodium chlorid, sodium sulfate and sulfur derivatives, in the following proportions by volume: of dust and chemicals 40 to 60%, of bitumen 60% to 40%, and an aggregate comprising mineral and vegetable particles in equal proportions mixed in the following proportions: from 35% to 55% of bituminized dust and 45% to 65% of aggregate, substantially as described.

7. A new composition of matter comprising mineral dust of colloidal nature suspended in bitumen combined with pulverized lime, sodium chlorid, sodium sulfate and sulfur derivatives in the following proportions by volume: of dust and chemicals 40 to 60%, of bitumen 60% to 40%, and an aggregate comprising mineral and vegetable particles in equal proportions, 45% to 65% aggregate mixture being suspended in 35% to 55% of the impregnating and binding medium, substantially as described.

In witness whereof I have hereunto set my hand in the presence of two witnesses this first day of July, 1920.

REIMAN G. ERWIN.

In the presence of—
F. W. TURNER,
H. F. HANKS.